Nov. 1, 1932.  M. LAMBOT  1,885,923
CONTINUOUS PROCESS FOR THE TREATMENT OF IRON AND OTHER ORES
Filed May 1, 1928
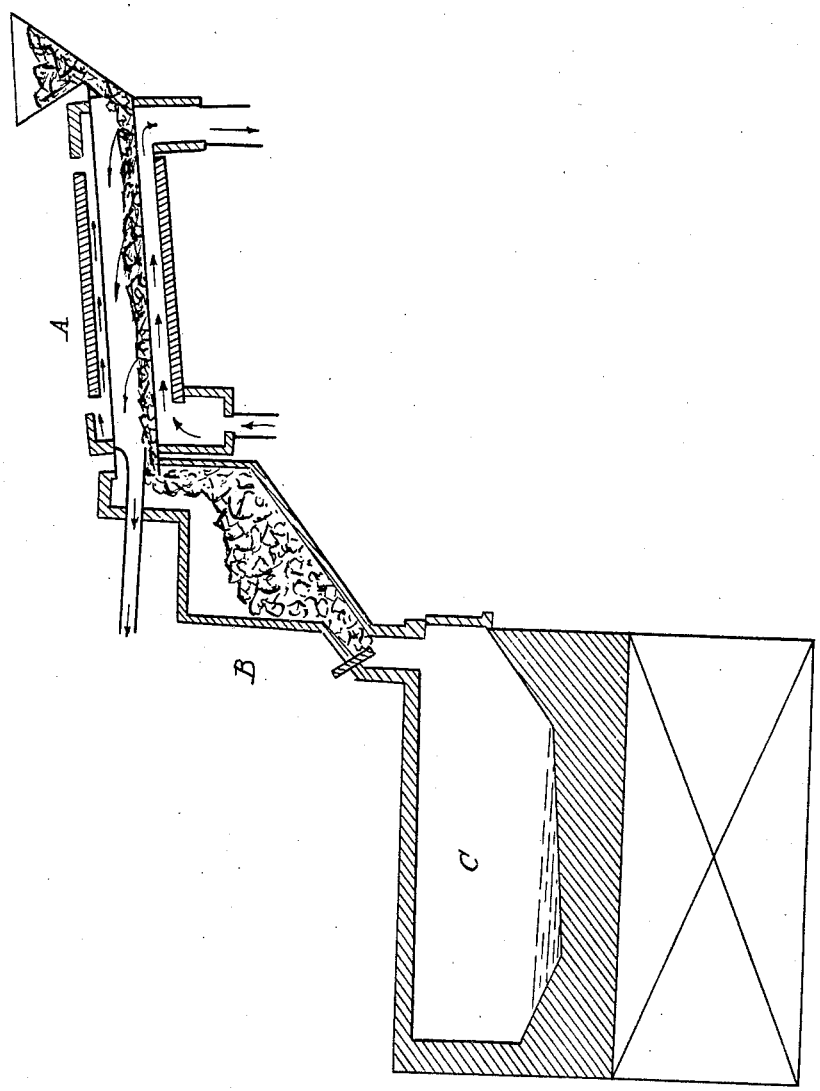

Patented Nov. 1, 1932

1,885,923

UNITED STATES PATENT OFFICE

MAURICE LAMBOT, OF FOREST-BRUSSELS, BELGIUM

CONTINUOUS PROCESS FOR THE TREATMENT OF IRON AND OTHER ORES

Application filed May 1, 1928, Serial No. 274,336, and in Belgium November 23, 1927.

The present invention is based on the reduction and carbonization of ores in the solid state in the presence of reducing agents also in the solid state.

It relates to a continuous process consisting essentially in treating the ores in several successive apparatus or in a combined apparatus which enables the complete treatment to be effected in the following three successive steps:

1. Reduction
2. Carbonization
3. Fusion

The process consists essentially:

(1) In treating the ore mixed with a reducing agent such as carbon in the form of a combustible solid preferably pulverulent (coal, lignite, etc.) in an apparatus preferably in the form of a rotating cylinder heated externally in such a manner as to effect the reduction and in some cases a certain degree of partial carbonization.

(2) In continuously delivering the solid products coming from the reducing apparatus into an apparatus or receptacle in which carbonization proceeds to the required degree by intimate contact between the hot reduced ore and the carbon not used in the reduction.

(3) In continuously or intermittently introducing the carbonized product or the material coming from the arbonizing apparatus into a suitable furnace which permits of the fusion of the product and the formation of a metal bath with separation of gangue or impurities.

One of the characteristic features of the invention consists in that the gaseous products developed during the reduction are conducted directly to the fusion or extraction furnace to be utilized for heating the furnace after purification and recovery, if desired, of by-products, or they may be tapped and used for other purposes.

Moreover the products of combustion coming from the fusion furnace are utilized wholly or in part for the heating of the reduction furnace or for producing new combinations in the reduction apparatus by contact with the materials introduced or with the gases developed.

The combustion products coming from one or the other of the furnaces or apparatus may serve if desired for the preliminary heating or roasting of the ores to be reduced.

The heating of the furnace and apparatus may also be effected by means of furnaces or gas producers constructed for this purpose or by means of available gas coming from another source.

In the accompanying drawing one mode of carrying the present invention into effect is shown by way of example.

The only figure shows a longitudinal section through an installation for carrying out the process according to the invention.

In the treatment of iron ore for example this is mixed with combustible material, preferably pulverulent, and if desired with addition products of any suitable form, and is introduced into the heated rotary cylinder A in which the preparatory reactions take place, these reactions including in particular the reduction of the ore and a certain carbonization of the metal as well as the development of gaseous products by distillation or reaction.

The gaseous products are utilized as described above.

The solid products obtained are continuously introduced in the heated condition into the apparatus or receptacle B in which the carbonization of the metal proceeds, the metal being in intimate contact with the excess of carbon. After remaining for a longer or shorter time as may be necessary for regulating the degree of carbonization, these products are delivered either continuously or intermittently into the fusion furnace C in which a metal bath is obtained. The refining of the metal bath can be carried on for a shorter or longer time and in all cases the metal can be completely refined in a known apparatus.

During the fusion of the metal there is also obtained separation of impurities in the form of slag which may be discharged wholly or in part.

The invention has been described by way of example only and not limitation and it is obvious, for example, that the fusion furnace illustrated may be heated by means of electrical energy.

I claim:

A process for the production of manufactured metal from iron ores which consists in mixing ore with coal, lignite or other carbonaceous material in such proportions as to have an excess of carbon, in progressing the mixture through a closed vessel which is heated externally to the temperature necessary to effect reduction of the ore and partial carbonization of the reduced metal, and from which the excess products of reduction are continuously withdrawn, in transferring the mixture of carbon and partly reduced metal to a second vessel in which the carbonization of the metal is completed and in discharging the mixture of carbon reduced metal from the second vessel into a melting vessel heated by the furnace.

MAURICE LAMBOT.